Patented Jan. 2, 1934

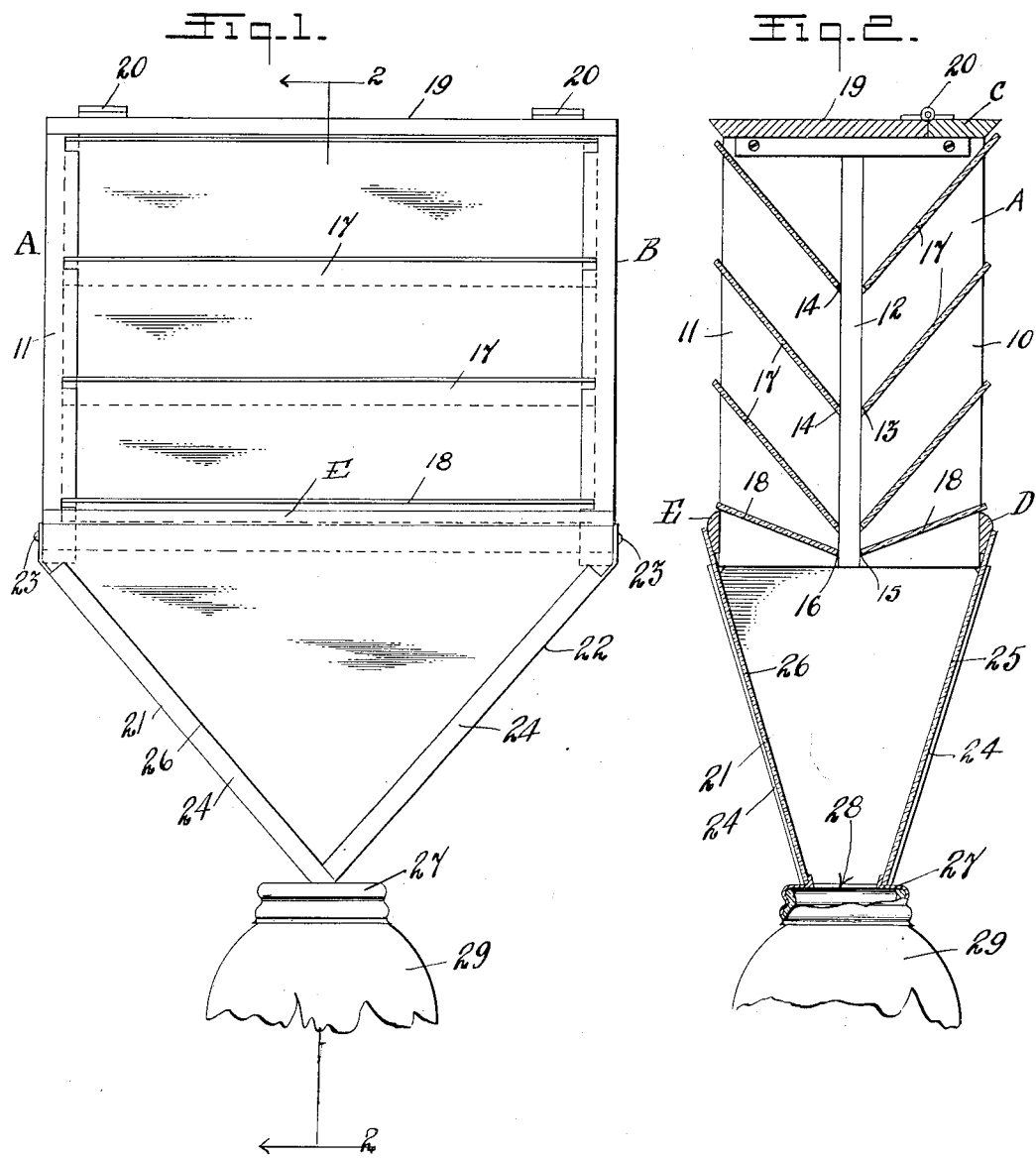

1,941,659

UNITED STATES PATENT OFFICE 1,941,659

INSECT TRAP

Stanton B. Coleman, Rutledge, Pa.

Application April 25, 1932. Serial No. 607,279

2 Claims. (Cl. 43—122)

This invention relates to insect traps, and more particularly to traps designed to lure and catch insects known as Japanese beetles.

An object of the invention is to provide a trap composed largely of glass or other transparent plates relatively invisible to the insects, against which they engage while seeking the lure provided for attracting them, said glass or transparent plates being so arranged as to direct the falling insect into a receptacle.

A further object of the invention is to provide an insect trap having glass or other transparent plates set at inclinations and in converging relation, the inclinations being overlapping in such position that an insect flying along a relatively straight line toward the trap must engage one of the glass plates, and by impact against the plate, be directed to an underlying and communicating receptacle.

The invention therefore comprises end pieces arranged to support glass plates at inclinations approaching downwardly toward a median line of the ends, the upper or diverging ends of the plates overlapping the inner or converging ends so that a relatively straight horizontal line followed by an insect must of necessity, engage against a downwardly inclined surface and direct the insect to a passage which communicates directly with an underlying receptacle.

The drawing illustrates an embodiment of the invention and the views therein are as follows:

Figure 1 is a view of the device in side elevation, and

Figure 2 is a transverse sectional view, taken on line 2—2 of Figure 1.

Like characters of reference indicate corresponding parts throughout the several views.

The improved insect trap, which forms the subject matter of this application, comprises end sections A and B, together with a top connecting strip C and side connecting strips D and E.

The end sections A and B may be composed of a single piece of material each, but for convenience of operation, are preferably composed as shown at Figure 2 of side strips 10 and 11 with a central strip or bead 12. When so constructed, the side strips 10 and 11 are grooved as at 13 and 14, the grooves being angular relative to the sides of the strips 10 and 11. When the strip 12 is employed, it operates as a stop, limiting the ends of the grooves 13 and 14. It is obvious, of course, that the same effect may be provided in a single piece of material or in two strips of material, with the central bead 12 omitted, but it has been found that such construction as shown is a convenient means of forming the ends.

All of the grooves 13 are parallel and the grooves 14 likewise parallel. Other grooves 15 and 16 are formed likewise in the side strips 10 and 11 limited by the abutment 12, but at an inclination to the bead forming a wider angle than the grooves 13 and 14.

Into the grooves 13 and 14, glass or other transparent plates 17 are inserted with similar, but of course narrower, plates 18 in the grooves 15 and 16. When so arranged, the inner edges of all of the glass plates 17 and 18 abut against the central bead 12 and form a continuous passage vertically throughout the entire structure thus formed.

A cover member 19 is attached to the frame strip C by means of hinges 20 so that a lure chamber is formed by the uppermost glass plates 17. This lure chamber is open along the line of the bead 12 and also preferably along the sides of the strips C and the cover 19. Such openings are for permitting the aroma of the lure to escape into the atmosphere to attract the insects which, being attracted, engage against the plates 17 and by reason of the impact, drop onto still lower plates 17 or 18 and by reason of the inclination, are chuted through the structure.

Underlying the structure is a hopper. This hopper is made up of end parts 21 and 22 which may preferably be made of sheet material and secured to the super-structure by means of nails or other fastening members, indicated at 23.

The plates 21 and 22 will be provided with upturned flanges 24 which will preferably hold and position inclined and tapered glass plates 25 and 26. The members 21 and 22, as well as glass plates 25 and 26 converge toward the lower end and the members 21 and 22 are firmly attached to a cover member 27 which has an opening therethrough shown at 28 communicating with the hopper formed by the converging structure and also with some container or receptacle 29 secured to the cover.

In operation, therefore, the lure chamber being supplied with a recognized lure, the insects will be attracted thereby, and flying toward the trap in substantially horizontal lines, will impinge against some of the plates 17, and by such impingement be deposited upon plates 17 or 18, and owing to the downward inclination and convergence, will be dropped into the hopper beneath. It has been found from experiment, that the hopper should be constructed in part of glass or other transparent material, and that this transparent part should occupy opposite sides of the hopper structure. Making the hopper of opaque material does not serve the purpose, as the insects in the hopper will travel upwardly along this opaque material and escape, but when the sides are constructed of transparent material, their tendency is to fly rather than crawl and they thereby impinge against parts of the hopper and by such parts are directed into the receptacle. Once in the receptacle, there is no escape as it may contain material to kill the insect or any means may be employed to prevent escape.

The making of the device of transparent material in all of the parts described has been found to add materially to the efficiency of the device in operation in the manner described, as the flying insect fails to notice the transparent plates and impinges against them to his own undoing.

Of course, the insect trap herein illustrated, may be modified and changed in various ways without departing from the invention herein set forth and hereinafter claimed.

The invention is hereby claimed as follows:

1. In an insect trap comprising a funnel and receptacle end members having grooves formed therein, said grooves being downwardly inclined toward convergence, and transparent plane plates seated in the grooves and stopping short of convergence forming a passage directed toward the funnel.

2. In an insect trap comprising a funnel and receptacle end members having downwardly inclined grooves extending inwardly from each side, a stop formed along the median vertical line of said end sections and common to the grooves of both inclinations, transparent plane plates inserted into the grooves and abutting the limiting stops and forming a passage in alinement with the funnel.

STANTON B. COLEMAN.